United States Patent
Choi et al.

(10) Patent No.: US 6,852,807 B2
(45) Date of Patent: Feb. 8, 2005

(54) RESIN COMPOSITIONS HAVING BIODEGRADATION AND HYDROLYSIS PROPERTIES

(75) Inventors: Jung Hwan Choi, Kunsan-shi (KR); Byung Doo Ahn, Seoul (KR)

(73) Assignee: Hyo Sig Jung, Jeonju-Shi (KR)

( * ) Notice: Subject to any disclaimer, the term of this patent is extended or adjusted under 35 U.S.C. 154(b) by 9 days.

(21) Appl. No.: 10/343,101
(22) PCT Filed: Jul. 26, 2001
(86) PCT No.: PCT/KR01/01272

§ 371 (c)(1),
(2), (4) Date: Jan. 27, 2003

(87) PCT Pub. No.: WO02/14431

PCT Pub. Date: Feb. 21, 2002

(65) Prior Publication Data

US 2004/0039135 A1 Feb. 26, 2004

(30) Foreign Application Priority Data

Jul. 29, 2000 (KR) ........................................ 2000-43995

(51) Int. Cl.$^7$ ............................ C08L 67/02; C08L 75/06
(52) U.S. Cl. ........................................ 525/440; 525/938
(58) Field of Search ................................. 525/440, 938

(56) References Cited

U.S. PATENT DOCUMENTS 5,786,408 A * 7/1998 Kuroda et al. ............... 523/124

FOREIGN PATENT DOCUMENTS

| | | |
|---|---|---|
| JP | 4275365 | 9/1992 |
| JP | 2001081152 | 3/2001 |
| KR | 1996-7000309 | 1/1996 |
| KR | 1996-0008112 | 6/1996 |
| KR | 2001-0013503 | 2/2001 |
| WO | WO 98/01493 | 1/1998 |

* cited by examiner

*Primary Examiner*—Patricia A. Short
(74) *Attorney, Agent, or Firm*—Baker & McKenzie

(57) ABSTRACT

There are provided a biodegradable and hydrolyzable resin composition having good physical properties such as tensile strength and elongation and a resin having widespread applications as wastebag films and food packaging films.

7 Claims, 3 Drawing Sheets

RESIN COMPOSITIONS HAVING BIODEGRADATION AND HYDROLYSIS PROPERTIES

CROSS-REFERENCE TO RELATED APPLICATIONS

This application is a U.S. National Phase Application under 35 U.S.C. 371 of International Patent Application no. PCT/KR01/01272, filed Jul. 26, 2001, which claims the benefit of Korean Patent Application no. 2000/43995, filed Jul. 29, 2000.

BACKGROUND OF THE INVENTION

1. Field of the Invention

The present invention relates generally to a biodegradable and hydrolyzable resin composition having good physical properties such as tensile strength. More specifically, the present invention relates to a resin composition obtained by blending a thermoplastic aliphatic polyester resin and a polyester urethane. The present resin composition has widespread applications such as wastebag films and food packaging films.

2. Description of the Related Arts

Generally, synthetic resins have been used in daily lives because of good mechanical properties, chemical resistance, durability and so on. However, because these resins are not biodegradable, the wastes of used resins cause a serious environmental pollution. Therefore, there has been a need for biodegradable resins that can substitute for synthetic resins, and various research has been made to develop them.

However, the obtained resins having 100% of biodegradation exhibit very weak strength not suitable for wastebags or packaging films. Therefore, there has been need for new resins having both biodegradability and improved strength.

As a biodegradable resin, aliphatic polyester has been used (Journal of Macromol SCi-Chem., A-23(3), 1986, 393–409). But, because of their main chain structure and crystalline characters, the above aliphatic polyester has a low melting point and a high melt flow index exhibiting poor heat resistance and physical properties such as mechanical strength.

To improve these properties of aliphatic polyesters, Japanese Laid-open Patents (Laid-open Publication No. 4-189822 and No. 4-189823) proposed a method for increasing molecular weight of aliphatic polyester by reacting aliphatic dicarboxylic acid with glycol to obtain aliphatic polyester with about 15,000 of number average molecular weight (hereinafter referred to as Mn), then crosslinking the aliphatic polyester with diisocynate. However, while preparing of low-molecular-weight aliphatic polyester with this method, undesirable microgel particles are formed and deteriorate the quality. Besides, because the diisocynate crosslinks with aliphatic polyester in a short time, unreacted diisocynates exist in products and become a new factor of pollution.

Accordingly, in order to solve the conventional problems and to improve the physical properties of biodegradable resins, the present inventors have researched repeatedly to find that resin compositions obtained by blending biodegradable aliphatic polyester resin with hydrolyzable polyester urethane having good processing property and high molecular weight, exhibit good physical and molding properties as well as good biodegradability and hydrolyzability.

SUMMARY OF THE INVENTION

Therefore, one object of the present invention is to provide a biodegradable and hydrolyzable resin composition having good physical properties such as tensile strength and elongation.

Another object of the present invention is to provide a resin obtained by extrusion or injection molding of said resin compositions.

Further another object of the present invention is to provide packaging films made from said resins.

In order to achieve said objects, the present invention provides a resin composition obtained by blending:

(1) 20~99 weight % of an aliphatic polyester formed by an esterification of aliphatic dicarboxylic acid or its anhydride and aliphatic glycol; and/or unsaturated aliphatic dicarboxylic acid or its anhydride and unsaturated aliphatic glycol, and a glycol-removing reaction thereafter, wherein said polyester has a melting point of 30~200, a number average molecular weight of 1,500~150,000 and a weight average molecular weight of 1,500~300,000; and (2) 80~1 weight % of a polyester urethane formed by a reaction of aliphatic polyester and diisocynate, wherein said polyester urethane has a melting point of 120~200, a number average molecular weight of 1,000~150,000, a weight average molecular weight of 1,500~300,000 and a surface hardness of 50~120(A type).

These and other objects and advantages of the invention will become apparent to those skilled in the art from the following detailed description with the aids of the accompanying drawings.

DETAILED DESCRIPTION OF THE INVENTION

Figure 1:
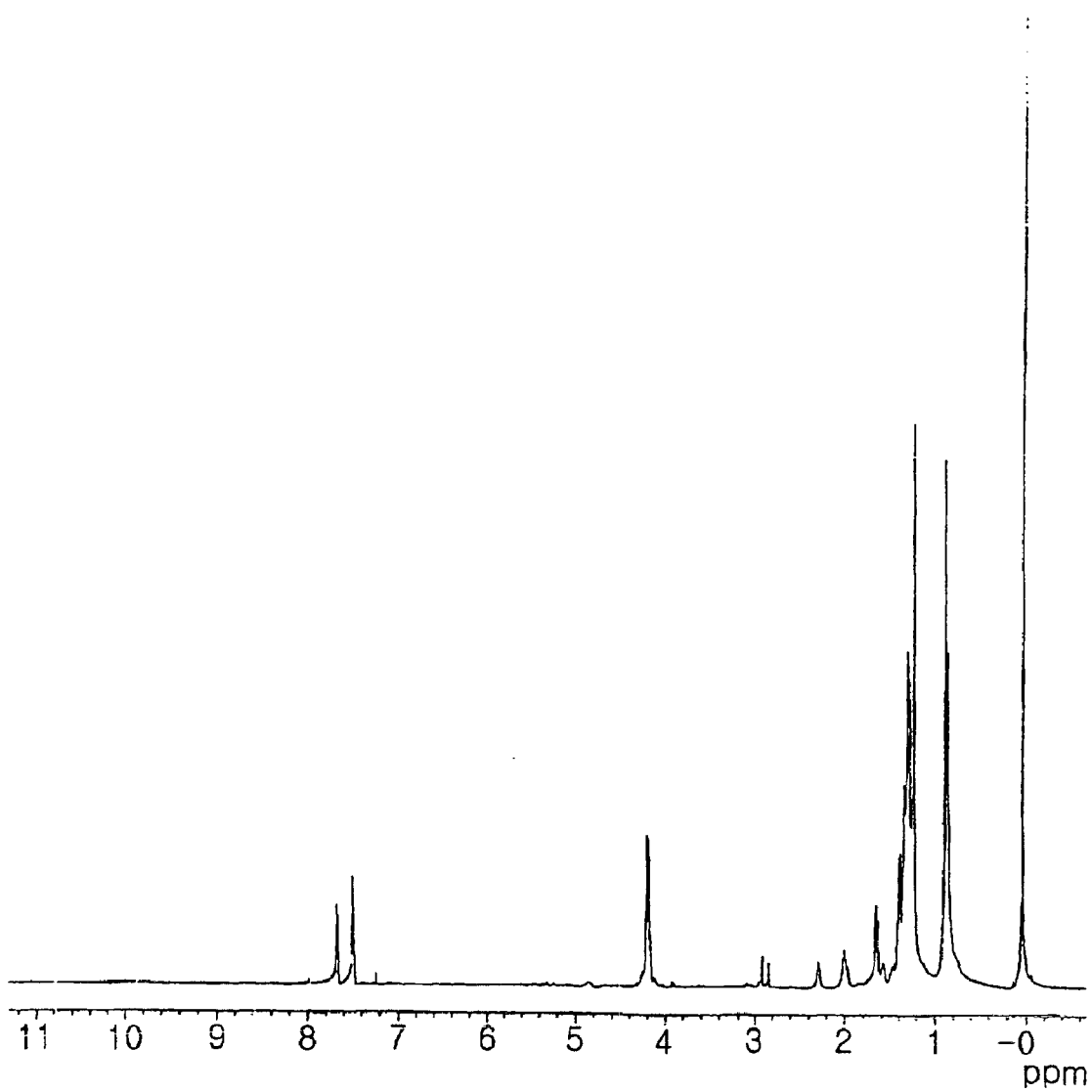
FIG. 1 is a H-NMR spectrum for solid component of compost containing a product of Example 1 after biodegradation test.

The following is a detailed description of the present invention.

The present invention is based on the findings that biodegradable aliphatic polyester resin can exhibit improved physical properties by blending with polyester urethane. Accordingly, the present invention can solve the conventional problems that films molded from only aliphatic polyester exhibit weak strength, and thus do not have a widespread application.

Further, after the resin composition according to the present invention is used as package films or agricultural materials, it can be biodegraded in the soil and hydrolyzed by moisture in air, water or soil. That is, the present invention can solve the problems related to environmental pollution.

The following is a detailed description of the best mode of the present invention.

According to the present invention, an aliphatic polyester as one component of the resin composition, can be formed by an esterification of aliphatic dicarboxylic acid or its anhydride and aliphatic glycol; and unsaturated aliphatic dicarboxylic acid or its anhydride or unsaturated aliphatic glycol, and a glycol-removing reaction thereafter.

For the preparation of the aliphatic polyester, said dicarboxylic acid may be, but not limited thereto, aliphatic dicarboxylic acid with a methylene group having a carbon number of 0~12. Preferably, aliphatic dicarboxylic acid may be one or more selected from a group consisting of oxalic acid; malonic acid; succinic acid; glutaric acid; adipic acid; pimelic acid; suberic acid; sebacic acid; nonandicarboxylic acid; dodecanedioic acid; methyl malonic acid; ethyl malonic acid; dimethyl malonic acid; methyl succinic acid; 2,2-dimethyl succinic acid; 2,3-dimethyl succinic acid; 2-ethyl-2-methyl succinic acid; 2-methyl glutaric acid; 3-methyl glutaric acid; 3-methyl adipic acid; dimethyl succinate; and dimethyl adipate.

And, said unsaturated aliphatic dicarboxylic acid may be, but not limited thereto, one or more selected from a group consisting of fumaric acid; maleic acid; citric acid; 1-hexen-1,6-dicarboxylic acid; 3-hepten-1,7-dicarboxylic acid; 2-penten-1,5-dicarboxylic acid; 2,5-dimethyl-3-hexen-1,6-dicarboxylic acid; 2-cyclohexen-1,4-dicarboxylic acid; allylmalic acid; itaconic acid; and succinic anhydride.

Further, said aliphatic glycol may be, but not limited thereto, glycol having a carbon number of 2~12. Preferably, it may be diol with hydroxyl groups at both the ends or its structural isomers, or glycol with ether group. For example, said diol or its isomer may be, but not limited thereto, one or more selected from a group consisting of ethylene glycol; propylene glycol; 1,3-propandiol; trimethylene glycol; 1,2-butanediol; 1,4-butanediol; neopentyl glycol; 1,6-hexanediol; 1,4-cyclohexane dimethanol; and 1,10-decanediol. And, said glycol with ether group may be, but not limited thereto, one or more selected from a group consisting of diethylene glycol; triethylene glycol; and polyethylene glycol having a molecular weight of 3,000 or less.

Further, said unsaturated aliphatic glycol may be, but not limited thereto, glycol represented by the following Formula 1, for example 2-buten-1,4-diol; 2-penten-1,5-diol; 3-hexen-1,6-diol, and 2-buten-1,4-dimethyl-1,4-diol:

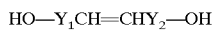  [Formula 1]

(wherein, $Y_1$ and $Y_2$ are alkyl groups having a carbon number of 1~20, respectively.)

As one component of the resin composition of the present invention, an aliphatic polyester can be prepared by an esterification of said dicarboxylic acid and said glycol, and a glycol-removing reaction thereafter. The resulting aliphatic polyester may be represented by the following Formula 2:

Further, in preparation of the aliphatic polyester, unsaturated aliphatic dicarboxylic acid or its anhydride, or unsaturated aliphatic glycol is incorporated in an amount of 0.01~20% by weight of the composition.

According to the present invention, the resulting biodegradable polyester resin has physical properties shown in Table 1:

TABLE 1

| | Tensile strength (kgf/cm$^2$) | Elongation (%) | Melting point (° C.) | *MI | **Mn | ***Mw |
|---|---|---|---|---|---|---|
| Polyester resin | 250~550 | 250~900 | 30~200 | 3~50 | 1,500~150,000 | 1,500~300,000 |

(Note)
*MI is melt index,
**Mn is number average molecular weight, and
***Mw is weight average molecular weight.

According to the present invention, a polyester urethane as the other component of the resin composition, can be formed by a reaction of polyester resin and diisocynate. Preferably, the polyester resin may be biodegradable and have a molecular weight of 1,000~3,000 and a viscosity (at 60° C.) of 100~5,000 cps.

Further, in preparation of polyester urethane, diisocynate may be, but not limited thereto, one or more selected from a group consisting of hexamethylene diisocynate; 1,4-tolylene diisocynate; 2,4-toluene diisocynate; xylene diisocynate; 1,5-naphthalene diisocynate; diphenylmethadiisocynate; isoprene diisocynate; and 2,6-diisocynate. And, diisocynate may be incorporated in an amount of 5~100 parts by weight based on 100 parts by weight of polyester with a molar ratio of 1:1.

For example, in case that methylene diisocynate represented by the following Formula 3 may be used as a diisocynate, the resulting polyester urethane may be represented by the following Formula 4:

[Formula 3]
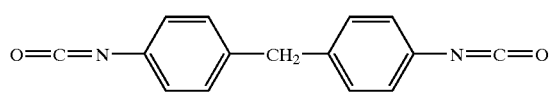

[Formula 4]
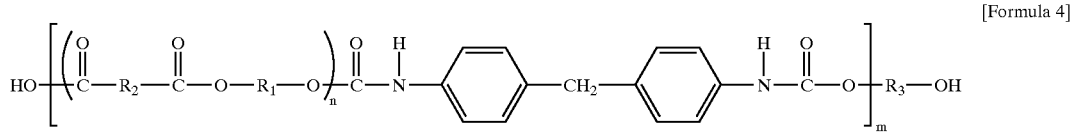

(wherein, R1 is aliphatic diol and R2 is dicarboxylic acid.)

[Formula 2]
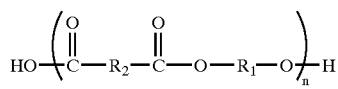

(wherein, R1 is aliphatic diol and R2 is dicarboxylic acid.)

According to the present invention, the resulting polyester urethane has physical properties shown in Table 2:

TABLE 2

| | Tensile strength (kgf/cm$^2$) | Elongation (%) | Melting point (° C.) | Surface hardness (A type) | Diisocynate (pbw) | Molar ratio (Polyester resin: Diisocynate) | Mn | Mw |
|---|---|---|---|---|---|---|---|---|
| Urethane | 250~900 | 250~1,000 | 120~200 | 50~120 | 5~100 | 1:1 | 1,000~150,000 | 1,500~500,000 |
| Polyester | | | | | | | | |

According to the present invention, the blending ratio of aliphatic polyester and polyester urethane is in the range of 20~99:80~1 by weight percentage and preferably in the range of 20~60:80~40. This is based on the findings that aliphatic polyester has a lower melting point than polyester urethane, resulting in that an excess of aliphatic polyester interferes with blending.

Before blending, it may be desirable to dry off each resin in an oven or a vacuum drier or with hot air for 3~4 hours. Blending may proceed in a injection or extrusion machine. Although a condition for blending may be dependent on a molding machine, it is preferable to control a molding temperature to an incorporation ratio, as indicated in Table 3.

TABLE 3

| Aliphatic polyester (wt %) | Polyester urethane (wt %) | 1st molding temp. (° C.) | 2nd molding temp. (° C.) | 3rd molding temp. (° C.) | 4th molding temp. (° C.) |
|---|---|---|---|---|---|
| 1~20 | 99~80 | 160 | 175 | 185 | 175 |
| 21~40 | 79~60 | 155 | 170 | 180 | 175 |
| 41~60 | 59~40 | 155 | 170 | 175 | 175 |
| 61~80 | 39~20 | 155 | 165 | 175 | 160 |
| 81~99 | 19~1 | 120 | 155 | 160 | 160 |

A resin obtained from the composition according to the present invention, for example, may have a structure represented by the following Formula 5.

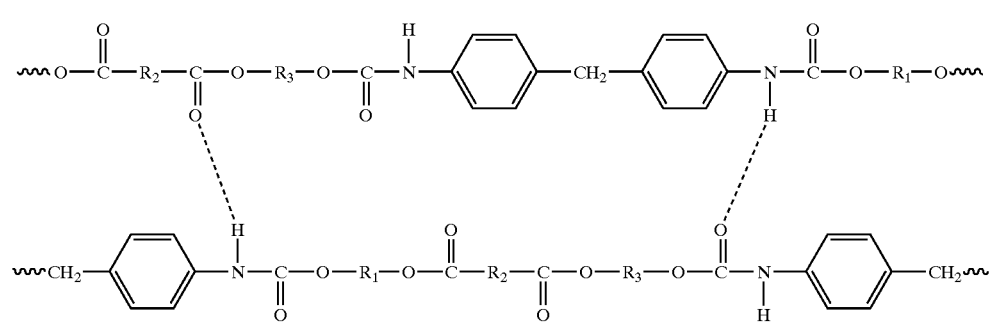

[Formula 5]

PREFERRED EMBODIMENTS OF THE INVENTION

The present invention will be described in more detail by way of the following Examples, which should not be considered to limit the scope of the present invention.

REFERENCE EXAMPLE 1

Esterification was performed in a 250 ml of four-inlet hard glass flask equipped with separate condenser having a mixer, an inlet for gas injection, an outlet for discharging low boiling point compounds such as water, and a thermometer. Adipic acid 43.8 g and 1,4-butanediol 35.7 g was introduced into the flask. Esterification was performed by dehydration in a nitrogen atmosphere at a temperature of 180~200° C.

After discharging water, tetraisopropyl titanate 2.12×10$^{-4}$ mol, as a glycol-removing catalyst, was introduced into the resulting oligomer in a nitrogen atmosphere. Reaction was performed at a temperature of 215° C. and in a condition of reduced pressure. Resulting polyester has melting point of 60° C., tensile strength of 350 kgf/cm$^2$, elongation of 600%, MI of 15 g/10 min.

REFERENCE EXAMPLE 2

Esterification was performed in a 250 ml of four-inlet hard glass flask equipped with a separate condenser having a mixer, an inlet for gas injection, an outlet for discharging low boiling point compounds such as water and a thermometer. Succinic acid 28.3 g and adipic acid 8.77 g and 1,4-butanediol 35.7 g was introduced into the flask. Esterification was performed by dehydration in a nitrogen atmosphere at a temperature of 180~200° C.

After discharging water, tetraisopropyl titanate 2.12×10$^{-4}$ mol, as a glycol-removing catalyst, was introduced into the resulting oligomer in a nitrogen atmosphere. Reaction was performed at a temperature of 215° C. and in a condition of reduced pressure. Resulting polyester has a melting point of 80° C., a tensile strength of 400 kgf/cm$^2$, elongation of 700% and an MI of 20 g/10 min.

REFERENCE EXAMPLE 3

Esterification was performed in a 250 ml of four-inlet hard glass flask equipped with a separate condenser having a mixer, an inlet for gas injection, an outlet for discharging low boiling point compounds, for example water, and a thermometer. Succinic acid 31.88 g, adipic acid 4.38 g and 1,4-butanediol 35.7 g were introduced into the flask. Esterification was performed by dehydration in a nitrogen atmosphere at a temperature of 180~200° C.

After discharging the water, tetraisopropyl titanate $2.12 \times 10^{-4}$ mol as a glycol-removing catalyst was introduced into the resulting oligomer in a nitrogen atmosphere. The reaction was performed at a temperature of 215° C. and in a condition of reduced pressure. Resulting polyester has a melting point of 100° C., a tensile strength of 450 kgf/cm², elongation of 750%, and an MI of 20 g/10 min.

REFERENCE EXAMPLE 4

Esterification was performed in a 250 ml of four-inlet hard glass flask equipped with a separate condenser having a mixer, an inlet for gas injection, an outlet for discharging low boiling point compounds, for example water, and a thermometer. Succinic acid 35.4 g and 1,4-butanediol 35.7 g was introduced into the flask. Esterification was performed by dehydration in a nitrogen atmosphere at a temperature of 180~200° C.

After discharging the water, tetraisopropyl titanate $2.12 \times 10^{-4}$ mol as a glycol-removing catalyst was introduced into the resulting oligomer in a nitrogen atmosphere. The reaction was performed at a temperature of 215° C. and in a condition of reduced pressure. Resulting polyester has a melting point of 114° C., a tensile strength of 450 kgf/cm², elongation of 650% and an MI of 20 g/10 min.

EXAMPLE 1

50,000G of vacuum drier was set to a temperature of 60° C. with nitrogen gas. 1,000 g of polyester prepared in the Reference Example 1 and 9,000 g of polyester urethane (NEOTHANE 5075AP™ manufactured in Hosung Chemex Co. Ltd.) were mixed and then introduced into a rotatory vacuum drier to be dried for 3 hours. The used polyester urethane had a melting point of 180° C., a tensile strength of 400 kgf/cm₂, elongation of 800% and a surface hardness of 75A.

Then, half of the mixture (5,000 g) was introduced into an extruder equipped with a hopper drier. Temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 2

50,000G of vacuum drier was set to a temperature of 60° C. with nitrogen gas. 2,000 g of polyester prepared in the Reference Example 1 and 8,000 g of polyester urethane (NEOTHANE 5075AP™ manufactured in Hosung Chemex Co. Ltd.) were mixed and then introduced into a rotatory vacuum drier to be dried for 3 hours. The used polyester urethane had melting point of 180° C., a tensile strength of 400 kgf/cm², elongation of 800%, and a surface hardness of 75A.

Then, half of the mixture (5,000 g) was introduced into an extruder equipped with a hopper drier. Temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in me 3rd die and 180° C. in the 4th die. In this condition, a dumbbell was molded.

EXAMPLE 3

50,000G of vacuum drier was set to a temperature of 60° C. with nitrogen gas. 3,000 g of polyester prepared in Reference Example 1 and 7,000 g of polyester urethane (NEOTHANE 5075AP™ manufactured in Hosung Chemex Co. Ltd.) were mixed and then introduced into a rotatory vacuum drier to be dried for 3 hours. The used polyester urethane had melting point of 180° C., a tensile strength of 400 kgf/cm², elongation of 800% and a surface hardness of 75A.

Then, half of the mixture (5,000 g) was introduced into an extruder equipped with a hopper drier. Temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 4

50,000G of vacuum drier was set to a temperature of 60° C. with nitrogen gas. 4,000 g of polyester prepared in Reference Example 1 and 6,000 g of polyester urethane (NEOTHANE 5075AP™ manufactured in Hosung Chemex Co. Ltd.) were mixed and then introduced into a rotatory vacuum drier to be dried for 3 hours. The used polyester urethane had melting point of 180° C., a tensile strength of 400 kgf/cm², elongation of 800% and a surface hardness of 75A Then, half of the mixture (5,000 g) was introduced into an extruder equipped with a hopper drier. The temperature in the extruder L/D24 was set to 165° C. in the 1st die at the hopper, 170° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 5

50,000G of vacuum drier was set to a temperature of 60° C. with nitrogen gas. 6,000 g of Polyester prepared in Reference Example 1 and 4,000 g of polyester urethane (NEOTHANE 5075AP™ manufactured in Hosung Chemex Co. Ltd.) were mixed and then introduced into a rotatory vacuum drier to be dried for 3 hours. The used polyester urethane had a melting point of 180° C., a tensile strength of 400 kgf/cm², elongation of 800% and a surface hardness of 75A.

Then, half of the mixture (5,000 g) was introduced into an extruder equipped with a hopper drier. The temperature in the extruder L/D24 was set to 155° C. in the 1st die at the hopper, 165° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 6

50,000G of vacuum drier was set to a temperature of 60° C. with nitrogen gas. 1,000 g of Polyester prepared in Reference Example 2 and 9,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 7

50,000G of vacuum drier was set to a temperature of 60° C. with nitrogen gas. 2,000 g of polyester prepared in Reference Example 2 and 8,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 8

50,000G of vacuum drier was set to a temperature of 60° C. with nitrogen gas. 3,000 g of polyester prepared in Reference Example 2 and 7,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 9

50,000G of vacuum drier was set to a temperature of 60° C. with nitrogen gas. 4,000 g of Polyester prepared in Reference Example 2 and 6,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 165° C. in the 1st die at the hopper, 170° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 10

50,000G of vacuum drier was set to a temperature of 60° C. with nitrogen gas. 6,000 g of polyester prepared in Reference Example 2 and 4,000 g of polyester urethane (NEOTHANE 5085AP™ manufactured in Hosung Chemex Co. Ltd.) were mixed and then introduced into a rotatory vacuum drier to be dried for 3 hours. The used polyester urethane had melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 155° C. in the 1st die at the hopper, 165° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 11

50,000G of vacuum drier was set to a temperature of 60° C. with nitrogen gas. 1,000 g of Polyester prepared in Reference Example 3 and 9,000 g of polyester urethane (NEOTHANE 5085AP™ manufactured in Hosung Chemex Co. Ltd.) were mixed and then introduced into a rotatory vacuum drier to be dried for 3 hours. The used polyester urethane had melting point of 180° C., a tensile strength of 450 kgf/cm$^2$, elongation of 650% and a surface hardness of 85A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 12

50,000G of vacuum drier was set to a temperature of 60° C. with nitrogen gas. 2,000 g of polyester prepared in Reference Example 3 and 8,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 85A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 13

50,000G of vacuum drier was set to a temperature of 60° C. with nitrogen gas. 3,000 g of polyester prepared in Reference Example 3 and 7,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 85A.

Then, half of the mixture (5,000 g) was introduced into an extruder equipped with a hopper drier. The temperature in the extruder L/D24 was set to 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 14

50,000G of vacuum drier was set to a temperature of 60° C. with nitrogen gas. 4,000 g of polyester prepared in Reference Example 3 and 6,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 85A.

Then, half of the mixture (5,000 g) was introduced into an extruder equipped with a hopper drier. The temperature in the extruder L/D24 was set to 165° C. in the 1st die at the hopper, 170° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 15

50,000G of vacuum drier was set to a temperature of 60° C. with nitrogen gas. 6,000 g of polyester prepared in Reference Example 3 and 4,000 g of polyester urethane (NEOTHANE 5085AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 85A.

Then, half of the mixture (5,000 g) was introduced into an extruder equipped with a hopper drier. The temperature in the extruder L/D24 was set to 155° C. in the 1st die at the hopper, 165° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 16

50,000G of vacuum drier was set to a temperature of 60° C. with nitrogen gas. 1,000 g of polyester prepared in Reference Example 4 and 9,000 g of polyester urethane (NEOTHANE 5198AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 98A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 17

50,000G of vacuum drier was set to a temperature of 60° C. with nitrogen gas. 2,000 g of polyester prepared in Reference Example 4 and 8,000 g of polyester urethane (NEOTHANE 5198AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 98A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 18

50,000G of vacuum drier was set to a temperature of 60° C. with nitrogen gas. 3,000 g of polyester prepared in Reference Example 4 and 7,000 g of polyester urethane (NEOTHANE 5198AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 98A.

Then, half of the mixture (5,000 g) was introduced into an extruder equipped with a hopper drier. The temperature in the extruder L/D24 was set to 170° C. in the 1st die at the hopper, 175° C. in the 2nd die, 185° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 19

50,000G of vacuum drier was set to a temperature of 60° C. with nitrogen gas. 4,000 g of polyester prepared in Reference Example 4 and 6,000 g of polyester urethane (NEOTHANE 5198AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 98A.

Then, half of the mixture (5,000 g) was introduced into an extruder equipped with a hopper drier. The temperature in the extruder L/D24 was set to 165° C. in the 1st die at the hopper, 170° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXAMPLE 20

50,000G of vacuum drier was set to a temperature of 60° C. with nitrogen gas. 6,000 g of polyester prepared in Reference Example 4 and 4,000 g of polyester urethane (NEOTHANE 5198AP™ manufactured in Hosung Chemex Co. Ltd.) were mixed and then introduced into a rotatory vacuum drier to be dried for 3 hours. The used polyester urethane had a melting point of 180° C., a tensile strength of 450 kgf/cm², elongation of 650% and a surface hardness of 98A.

Then, half of the mixture (5,000 g) was introduced into an extruder equipped with a hopper drier. The temperature in the extruder L/D24 was set to 155° C. in the 1st die at the hopper, 165° C. in the 2nd die, 175° C. in the 3rd die and 175° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

COMPARATIVE EXAMPLE 1

50,000G of vacuum drier was set to a temperature of 60° C. with nitrogen gas. 10,000 g of polyester prepared in Reference Example 4 was introduced into a rotatory vacuum drier to be dried for 3 hours.

Then, 5,000G of dried material were introduced into an extruder equipped with a hopper drier. The temperature in the extruder L/D24 was set to 100° C. in the 1st die at the hopper, 110° C. in the 2nd die, 120° C. in the 3rd die and 120° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

COMPARATIVE EXAMPLE 2

50,000G of vacuum drier was set to a temperature of 60° C. with nitrogen gas. 10,000 g of polyester urethane (NEOTHANE 5085AP™ manufactured in Hosung Chemex Co. Ltd.) was introduced into a rotatory vacuum drier to be dried for 3 hours. The used polyester urethane had a melting point of 180° C., a tensile strength of 450 kgf/cm², elongation of 650% and a surface hardness of 85A.

Then, 5,000 g of the dried material were introduced into an extruder equipped with a hopper drier. The temperature in the extruder L/D24 was set to 160° C. in the 1st die at the hopper, 175° C. in the 2nd die, 185° C. in the 3rd die and 180° C. in the 4th die, and the screw was rotated at 40 rpm. In this condition, a film was molded.

And, the other half (5,000 g) was introduced into an injector equipped with a hopper drier. The temperature in the injector was set to 160° C. in the 1st die at the hopper, 175° C. in the 2nd die, 185° C. in the 3rd die and 180° C. in the 4th die. In this condition, a dumbbell was molded.

EXPERIMENTAL EXAMPLE 1

The films and the dumbbells, which were produced in the Examples and in the Comparative Examples, were assessed with regard to their properties by means of the following methods. The results are shown in Tables 4 and 5.

<Property Test>

Test specimens were in the shape of film and dumbbell.

(1) Tensile Strength and Elongation

Targets were drawn at a point of exactly 20 cm from the center of the specimen, and then inserted into a test machine for tensile stress whose the lower or upper clamp parts are movable at constant speed. In case that a specimen slid at the upper or lower clamp parts, or that outside of the target was broken, the results were excluded and test was performed again. Tensile strength and elongation were calculated by the following formula and numerical mean for nine (9) measurement in transversal or longitudinal directions was obtained.

$$\text{Tensile strength} = \frac{\text{maximum load(kg) until broken}}{\{\text{thickness of specimen(cm)} \times \text{width of specimen(cm)}\}}$$

$$\text{Elongation} = \frac{\{\text{length between target points(mm) until broken} - \text{length between target points(mm) before test}\}}{\text{length between target points(mm) before test}} \times 100$$

(2) Tear Strength

Maximum load until broken was measured by tensile machine whose clamp part moved at a speed of 500 mm per minute. Tear strength was calculated by the following formula and numerical mean for nine (9) measurements in horizontal or vertical directions was obtained.

$$\text{Tear strength} = \frac{\text{maximum load(kg) until broken}}{\text{thickness of specimen(cm)}}$$

TABLE 4

Properties of the films produced in the Examples 1~20 and the Comparative Examples 1~2.

|  | Polyester (wt %) | Polyester urethane (wt %) | Tensile strength (kgf/cm$^2$) | Elongation (%) | Tear strength (kgf/cm$^2$) |
|---|---|---|---|---|---|
| Example 1 | 10 | 90 | 584 | 321 | 139 |
| Example 2 | 20 | 80 | 574 | 335 | 136 |
| Example 3 | 30 | 70 | 519 | 338 | 129 |
| Example 4 | 40 | 60 | 481 | 370 | 119 |
| Example 5 | 60 | 40 | 438 | 420 | 120 |
| Example 6 | 10 | 90 | 620 | 350 | 137 |
| Example 7 | 20 | 80 | 580 | 379 | 135 |
| Example 8 | 30 | 70 | 576 | 401 | 128 |
| Example 9 | 40 | 60 | 572 | 420 | 126 |
| Example 10 | 60 | 40 | 518 | 460 | 129 |
| Example 11 | 10 | 90 | 670 | 353 | 142 |
| Example 12 | 20 | 80 | 668 | 364 | 132 |
| Example 13 | 30 | 70 | 640 | 411 | 133 |
| Example 14 | 40 | 60 | 621 | 423 | 129 |
| Example 15 | 60 | 40 | 599 | 469 | 121 |
| Example 16 | 10 | 90 | 744 | 298 | 143 |
| Example 17 | 20 | 80 | 741 | 334 | 144 |
| Example 18 | 30 | 70 | 727 | 342 | 132 |
| Example 19 | 40 | 60 | 712 | 378 | 124 |
| Example 20 | 60 | 40 | 698 | 431 | 122 |
| Comp. Example 1 | 100 | — | 360 | 499 | 118 |
| Comp. Example 2 | — | 100 | 656 | 450 | 135 |

TABLE 5

Properties of the dumbbells produced in the Examples 1~20 and the Comparative Examples 1~2.

|  | Polyester (wt %) | Polyester urethane (wt %) | Tensile strength (kgf/cm$^2$) | Elongation (%) | Tear strength (kgf/cm$^2$) |
|---|---|---|---|---|---|
| Example 1 | 10 | 90 | 349 | 798 | 129 |
| Example 2 | 20 | 80 | 352 | 764 | 127 |
| Example 3 | 30 | 70 | 349 | 722 | 128 |
| Example 4 | 40 | 60 | 389 | 688 | 123 |
| Example 5 | 60 | 40 | 388 | 739 | 134 |
| Example 6 | 10 | 90 | 387 | 728 | 132 |
| Example 7 | 20 | 80 | 399 | 390 | 139 |
| Example 8 | 30 | 70 | 389 | 698 | 129 |
| Example 9 | 40 | 60 | 401 | 640 | 131 |
| Example 10 | 60 | 40 | 404 | 641 | 132 |
| Example 11 | 10 | 90 | 375 | 730 | 140 |
| Example 12 | 20 | 80 | 374 | 690 | 132 |
| Example 13 | 30 | 70 | 401 | 691 | 138 |
| Example 14 | 40 | 60 | 398 | 678 | 142 |
| Example 15 | 60 | 40 | 411 | 621 | 146 |
| Example 16 | 10 | 90 | 439 | 653 | 138 |
| Example 17 | 20 | 80 | 429 | 632 | 132 |
| Example 18 | 30 | 70 | 431 | 598 | 128 |
| Example 19 | 40 | 60 | 411 | 633 | 126 |
| Example 20 | 60 | 40 | 403 | 611 | 121 |
| Comp. Example 1 | 100 | — | 364 | 754 | 142 |
| Comp. Example 2 | — | 100 | 354 | 655 | 122 |

As shown in Tables 4 and 5, the resin according to the present invention exhibits improved properties similar to that of polyester urethane, and thereby has widespread applications.

EXPERIMENTAL EXAMPLE 2

The resin produced from the composition of the present invention was assessed with regard to its biodegradability in composting condition controlled in the laboratory.

① Materials

Compost was composed of food dreg 70%, sawdust 20%, aged food-compost 10%. The compost was fermented in an acryl reactor having a diameter of 29 cm and a height of 51 cm with temperature controlled by air feed. Fermentation in high temperature was made in about 17 days and then postfermentation was made for about 2 weeks. The fermented compost was used for biodegradability test.

As a sample, the film produced in Example 1 whose carbon content per weight was 62.5% and as a contrast, cellulose (provided by Sigma Corp.) were added into the compost in an amount of 5% by weight.

② Biodegradation Test

For biodegradation test, 150 g (wet weight; water content of 54.3%) of the solid compost were used, and the sample was added to the compost in an amount of 5% by dry weight, controlling not to be exposed. The mixture was introduced into the incubator bottle (3 bottle per sample) and a carbon dioxide ($CO_2$) collector was linked to each incubator. Biodegradability was evaluated by measuring the cumulated $CO_2$ production, for comparison, $CO_2$ production was also measured for the compost without sample material. Vapor was condensed and thereby collected water was fed back into the reactor in order to prevent drying of the compost.

During biodegradation test, after the first 3~4 days later, the first $CO_2$ collector was separated and analyzed for $CO_2$ concentration. Then, the $CO_2$ production was measured on every week. In order to measure $CO_2$ production, in case that collection solution was 0.4N of KOH solution, 2N of $BaCl_2$ solution was added to precipitate carbonate, and then, the solution was titrated with 0.2N of HCl solution in a indicator of phenolphthalein 0.1 ml. On the other hand, in case that the collection solution is $Ba(OH)_2$ solution, titration was directly made.

③ Analysis

A) Degradation Calculated by $CO_2$ Production

The $CO_2$ production was determined by calculating the following:

{(anticipated consumption of HCl solution)−(real consumption of HCl solution)×1.1}

And, the $CO_2$ production generated only from the sample material was determined by difference between $CO_2$ production of the compost containing sample material and that of the only compost without sample material.

Degradation was calculated by the following math formula 1:

$$\text{Degradation}(\%) = \frac{\text{measured } CO_2 \text{ production (ml)}}{\text{calculated } CO_2 \text{ production (ml)}} \times 100$$ [Math formula 1]

B) Analysis of the Residue

After the degradation was ended, the residues were collected from the reactors of the compost containing sample material and of the compost without sample material, respectively. And, the residues were dried and measured dry weight thereof. Then, some of the residue was extracted with 300 ml of distilled water in a bottle for 24 hours at a temperature of 75° C., and was filtered to obtain a solid component. The solid component was dried and measured dry weight thereof. Weight decrease was calculated the to mean amount of hot water extractable component. The solid component was extracted in a Soxhlet machine with chloroform for 24 hours to obtain organic solvent soluble component. Thereto excess of methanol was added to obtain the methanol-insoluble component, which was analyzed by NMR spectrum to confirm existence of the sample or intermediate product of degradation process.

④ Results

Biodegradation test proceeded for about 60~70 days. The biodegradability of the resin according to the present invention reached to about 60% by the first 20 days and additional 34% was degraded for the second 50 days resulting 94% by 70 days, through the biodegradation test. On the other hand, degradation of cellulose as a contrast was delayed for first 7 days, but after that proceeded continuously to reach 130% or more of calculated biodegradation for 70 days. This can be explained that the degradation of cellulose may accelerate the degradation of the biodegradable component of the compost.

As shown in the above results, the resin of the present invention can be evaluated to be completely biodegradabe, although the final biodegradability of the present resin is lower than that of cellulose, on the basis that the biodegradation speed is similar to that of cellulose and the final biodegradability exceed 90% of calculated value.

Figure 2:
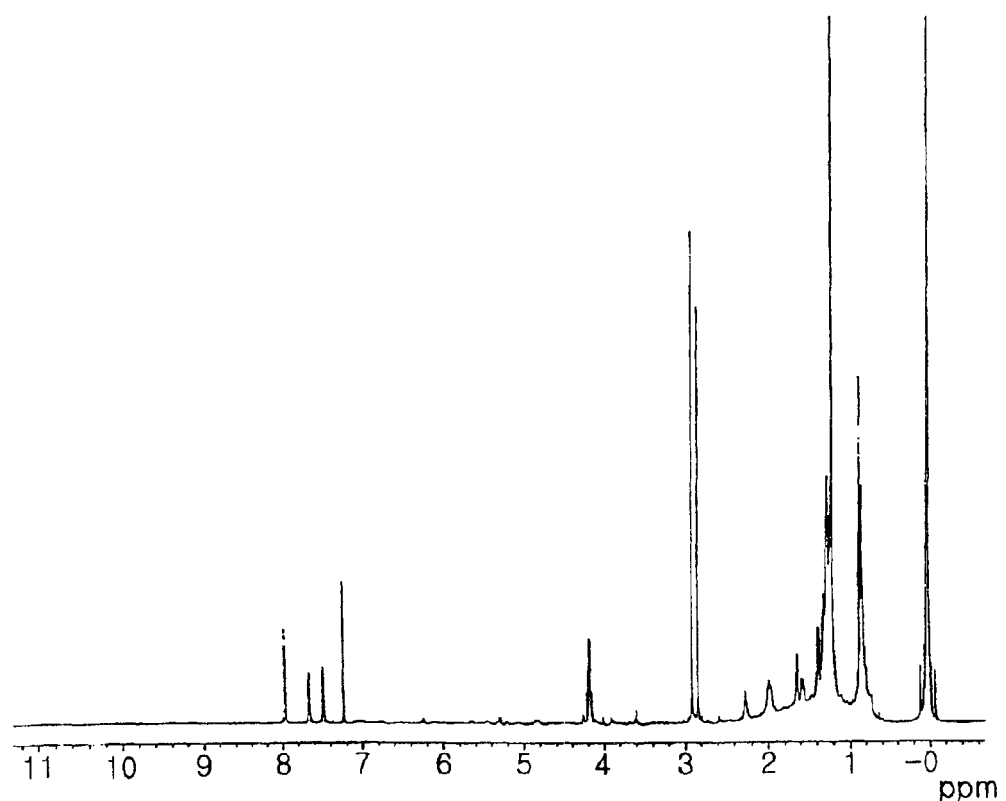
FIG. 2 is a H-NMR spectrum for solid component of compost free from a product of Example 1.
Figure 3:
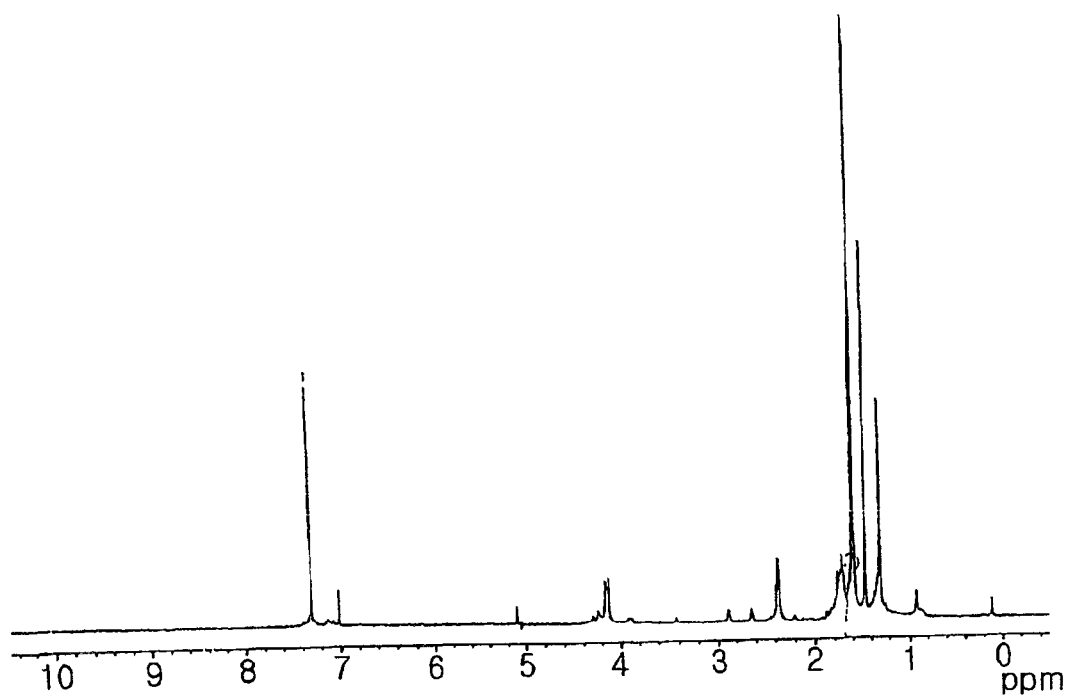
FIG. 3 is a H-NMR spectrum for a product of Example 1.

Further, in order to confirm if the biodegradability was overestimated alike that of cellulose, the solid component was analyzed by the NMR spectrum. The solid component was collected by extracting the compost with organic solvent and then methanol after composting test. The result is shown in FIG. 1. As a contrast, the only compost containing no sample material was extracted in the same method to obtain the solid component. The result is shown in FIG. 2. For comparison, only sample material was analyzed by NMR spectrum. The result is shown in FIG. 3. As shown in the FIGs, the characteristic peak of the FIG. 3 does not exist in the FIGS. 1 and 2. On the basis of this result, the resin of the present invention can be evaluated to be biodegradable resin.

As above described, the resin produced from the resin composition of the present invention exhibits good biodegradability and hydrolyzability as well as good physical properties, and therefore has widespread applications such as wastebag films.

Although the preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. An resin composition obtained by blending;
   (1) 20~99 weight % of an aliphatic polyester formed by an esterification of aliphatic dicarboxylic acid or its anhydride and aliphatic glycol; and/or unsaturated aliphatic dicarboxylic acid or its anhydride and unsaturated aliphatic glycol, and a glycol-removing reaction thereafter,
   wherein said polyester has a melting point of 30~200, a number average molecular weight of 1,500~150,000 and a weight average molecular weight of 1,500~300,000; and
   (2) 80~1 weight % of a polyester urethane formed by a reaction of aliphatic polyester and diisocynate,
   wherein said polyester urethane has a melting point of 120~200, a number average molecular weight of 1,000~150,000, a weight average molecular weight of 1,500~300,000 and a surface hardness of 50~120 (A type).

2. The resin composition according to claim 1, wherein said aliphatic dicarboxylic acid or its anhydride is one or more selected from a group consisting of oxalic acid; malonic acid; succinic acid; glutaric acid; adipic acid; pimelic acid; suberic acid; sebacic acid; nonandicarboxylic acid; dodecanedioic acid; methyl malonic acid; ethylmalonic acid; dimethyl malonic acid; methyl succinic acid; 2,2-dimethyl succinic acid; 2,3-dimethyl succinic acid; 2-ethyl-2-methyl succinic acid; 2-methyl glutaric acid; 3-methyl glutaric acid; 3-methyl adipic acid; dimethyl succinate; and dimethyl adipate.

3. The resin composition according to claim 1, wherein said aliphatic glycol is one or more selected from a group consisting of ethylene glycol; propylene glycol; trimethylene glycol; 1,2-butanediol; 1,4-butanediol; neopentyl glycol; 1,6-hexanediol; 1,4-cyclohexane dimethanol; 1,10-decanediol; and diethylene glycol.

4. The resin composition according to claim 1, wherein said unsaturated aliphatic dicarboxylic acid or its anhydride is one or more selected from a group consisting of fumaric acid; maleic acid; citric acid; 1-hexen-1,6-dicarboxylic acid; 3-hepten-1,7-dicarboxylic acid; 2-penten-1,5-dicarboxylic acid; 2,5-dimethyl-3-hexen-1,6-dicarboxylic acid; 2-cyclohexen-1,4-dicarboxylic acid; allylmalic acid; itaconic acid; and succinic anhydride.

5. The resin composition according to claim 1, wherein said unsaturated aliphatic glycol is one or more selected from a group consisting of 2-buten-1,4-diol; 2-penten-1,5-diol; 3-hexen-1,6-diol; and 2-buten-1,4-dimethyl-1,4-diol.

6. A resin obtained by extrusion or injection molding said resin composition of claim 1.

7. A packaging film made from said resin of claim 6.

* * * * *